United States Patent
Imada

(10) Patent No.: US 7,424,213 B2
(45) Date of Patent: Sep. 9, 2008

(54) CAMERA SYSTEM, IMAGE CAPTURING APPARATUS, AND A METHOD OF AN IMAGE CAPTURING APPARATUS

(75) Inventor: Shinji Imada, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 482 days.

(21) Appl. No.: 11/221,479

(22) Filed: Sep. 7, 2005

(65) Prior Publication Data
US 2006/0062557 A1 Mar. 23, 2006

(30) Foreign Application Priority Data
Sep. 17, 2004 (JP) .............................. 2004-271726

(51) Int. Cl.
*G03B 17/00* (2006.01)
(52) U.S. Cl. .................. 396/55; 396/54; 248/208.4; 248/208.6; 248/208.99
(58) Field of Classification Search ............... 396/54, 396/55; 348/208.4, 208.6, 208.99
See application file for complete search history.

(56) References Cited

U.S. PATENT DOCUMENTS

| | | | | |
|---|---|---|---|---|
| 5,640,612 A | * | 6/1997 | Owashi | 396/55 |
| 6,163,651 A | * | 12/2000 | Washisu et al. | 396/55 |
| 6,429,895 B1 | * | 8/2002 | Onuki | 348/208.99 |
| 6,734,903 B1 | * | 5/2004 | Takeda et al. | 348/219.1 |
| 2002/0122133 A1 | * | 9/2002 | Ejima | 348/362 |
| 2006/0028554 A1 | * | 2/2006 | Usui | 348/208.99 |
| 2006/0110147 A1 | * | 5/2006 | Tomita et al. | 396/55 |

FOREIGN PATENT DOCUMENTS

JP 5-007336 A 1/1993

* cited by examiner

*Primary Examiner*—W. B. Perkey
*Assistant Examiner*—Warren K Fenwick
(74) *Attorney, Agent, or Firm*—Canon U.S.A. Inc., IP Division

(57) ABSTRACT

A camera system includes a plurality of interchangeable lenses, each of which has an optical image stabilization unit for correcting image blurring, and a camera body. The camera body provides a shooting mode in which a set exposure time period is divided into a plurality of short exposure periods and images captured during the short exposure periods are combined while an image positional shift among the images is corrected. The short exposure period depends on the interchangeable lens mounted on the camera body.

5 Claims, 10 Drawing Sheets

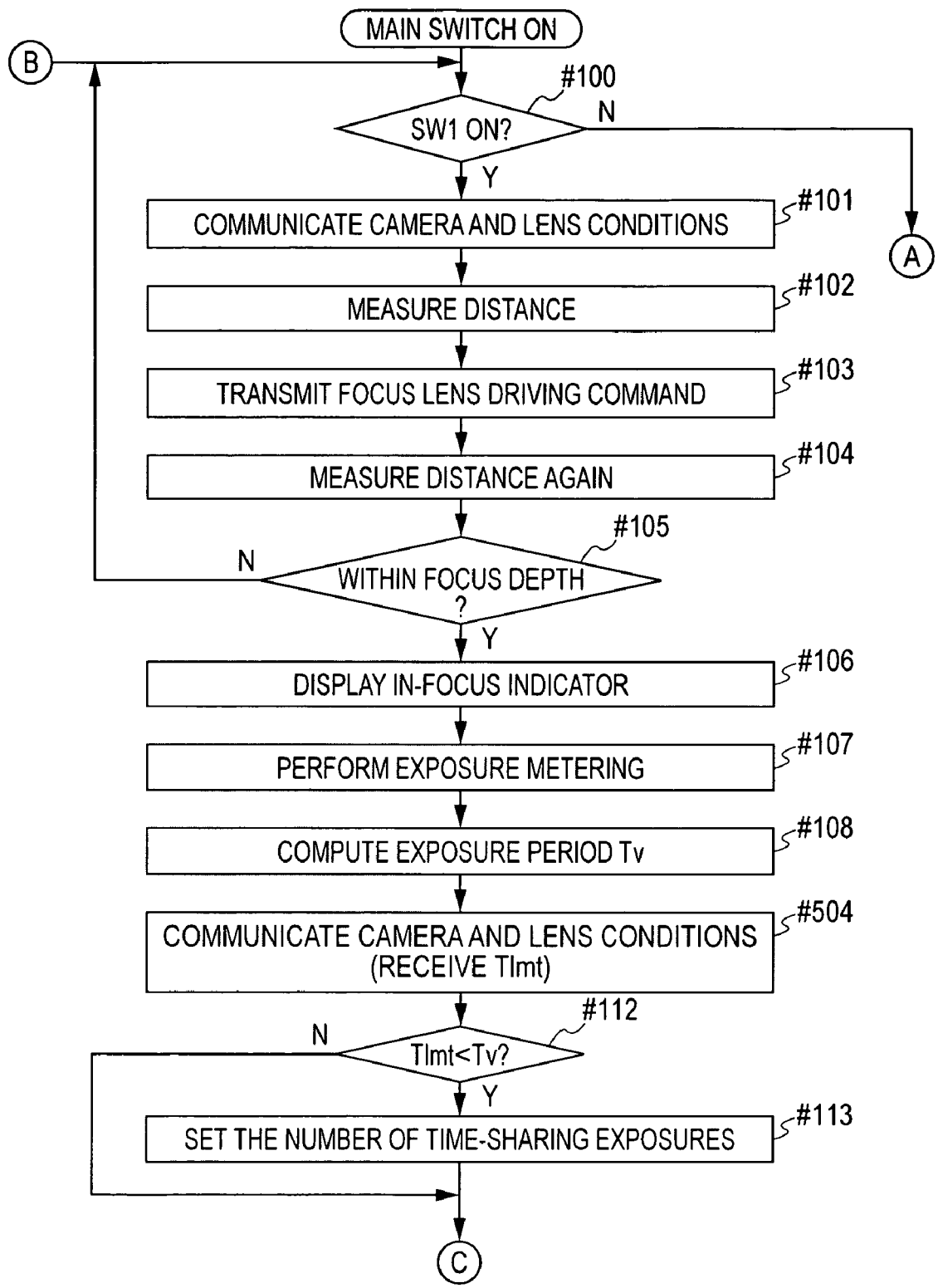

CAMERA SYSTEM, IMAGE CAPTURING APPARATUS, AND A METHOD OF AN IMAGE CAPTURING APPARATUS

BACKGROUND OF THE INVENTION

1. Field of the Invention

The present invention relates to an image capturing apparatus for increasing the precision of a captured image by compensating for image blur caused by hand-shake.

2. Description of the Related Art

In current cameras, all of the important operations required for shooting a picture, such as metering and focusing, are automated. Therefore, even persons inexperienced at operating cameras can easily shoot a picture. In addition, recently, cameras with a system for improving image blur caused by hand-shake have become available, thus eliminating most of the factors that can cause a photographer to make a mistake when shooting a picture.

An optical image stabilization technology, which is one of the available image stabilization systems for improving image blur caused by hand-shake, is described briefly. In general, the hand-shake of a camera at image capturing time is a vibration having a frequency of 1 to 10 Hz. To improve blurring of a captured image caused by hand-shake at exposure time, the vibration of the camera caused by hand-shake is detected to enable the displacement of a correction lens in a plane perpendicular to the optical axis in accordance with the detection result.

Accordingly, to carry out a precise image stabilization operation, the following two operations are required to be carried out: the accurate detection of the vibration of a camera and the accurate correction of the vibration of the optical axis on the basis of the detected vibration. To detect hand-shake, the acceleration, angular acceleration, angular velocity, and angular displacement of a camera are detected using a component such as a laser gyro, and a vibration detection unit for carrying out an arithmetic operation on the detection result is mounted in the image capturing apparatus. Thereafter, an optical correction apparatus is driven to deflect the shooting axis on the basis of the detected information about hand-shake provided by the vibration detection unit. Thus, blurring of the captured image can be improved.

According to Japanese Patent No. 3110797, image capturing device of a video camera accumulates electric charge (performs an exposure) in $\frac{1}{1000}$ of a second for an odd field and in $\frac{1}{60}$ of a second for an even field of an image signal. The area in the odd field that is saturated to black is corrected using an image signal in an even field in accordance with an exposure period to generate a corrected odd field signal. The area in the even field that is saturated to white is corrected using an image signal in an odd field in accordance with an exposure period to generate a corrected even field signal. Thus, the dynamic range of the image signal is virtually increased.

Image vibration can be improved using the time-sharing exposure method disclosed in Japanese Patent No. 3110797. For example, a determined exposure period is divided into a plurality of shorter ones each of which is sufficiently short to improve image blur caused by hand-shake, and an image capturing operation is repeated the number of times necessary for this division. The plurality of images captured by the plurality of capturing operations are combined while improving the shift among the images. As a result, the captured image (combined image) corresponding to the determined exposure period can be obtained.

To further improve the image blur caused by hand-shake, in addition to the above-described image stabilization system, a camera body may employ the above-described technique. In this case, an image is repeatedly captured using a shutter speed that is sufficiently high to avoid image blurring.

However, the shutter speed required to restrain image blurring within tolerable range (image stabilization limit) may be different depending on the performance of an optical image stabilization system in a mounted interchangeable lens. For example, one interchangeable lens having a focal length of 300 mm has an image stabilization limit of $\frac{1}{60}$-second shutter speed. Another lens having a focal length of 300 mm has an image stabilization limit of $\frac{1}{30}$-second shutter speed. In this case, the appropriate shutter speed for divided image capturing and the number of images that are captured are different for the two lenses.

More specifically, as the exposure period becomes longer, the noise of an image decreases. Accordingly, each exposure period for divided image capturing can be increased with increasing image stabilization performance of an interchangeable lens. Thus, a superior image with reduced noise can be obtained. Additionally, a longer time-sharing exposure period reduces the number of time-sharing exposures, which in turn reduces the number of shutter operations and the number of image data transfers. As a result, the image capturing time for obtaining a combined image can be reduced.

SUMMARY OF THE INVENTION

The present invention provides a camera system that can capture an image with improved image blurring and low noise.

According to an embodiment of the present invention, a camera system includes a plurality of interchangeable lenses each of which includes an image capturing optical system, vibration detection unit, and image stabilization unit; an image capturing apparatus arranged to divide an exposure time period into a plurality of shorter exposure periods; the image capturing apparatus including image combining unit for combining a plurality of images captured during the shorter exposure periods while correcting an image positional shift among the images; and exposure period control unit for determining the short exposure period in accordance with the mounted interchangeable lens.

By determining an optimal time-sharing exposure period in accordance with the image stabilization performance of an interchangeable lens and by capturing images on the basis of the exposure period, a camera system having high image stabilization performance can be provided.

According to an embodiment of the present invention, by increasing the time-sharing exposure period for a camera body in accordance with the image stabilization performance of the image stabilization device in an interchangeable lens, an image with low noise and improved image blurring can be obtained. Additionally, the total image capturing time in a divided-exposure shooting mode can be decreased.

Further features of the present invention will become apparent from the following description of exemplary embodiments with reference to the attached drawings.

BRIEF DESCRIPTION OF THE DRAWINGS

FIG. 10 is a flow chart illustrating the operation of a camera body according to the second embodiment of the present invention.

DESCRIPTION OF THE EMBODIMENTS

Embodiments of the present invention are described in detail with reference to the accompanying drawings.

First Embodiment

Figure 1:
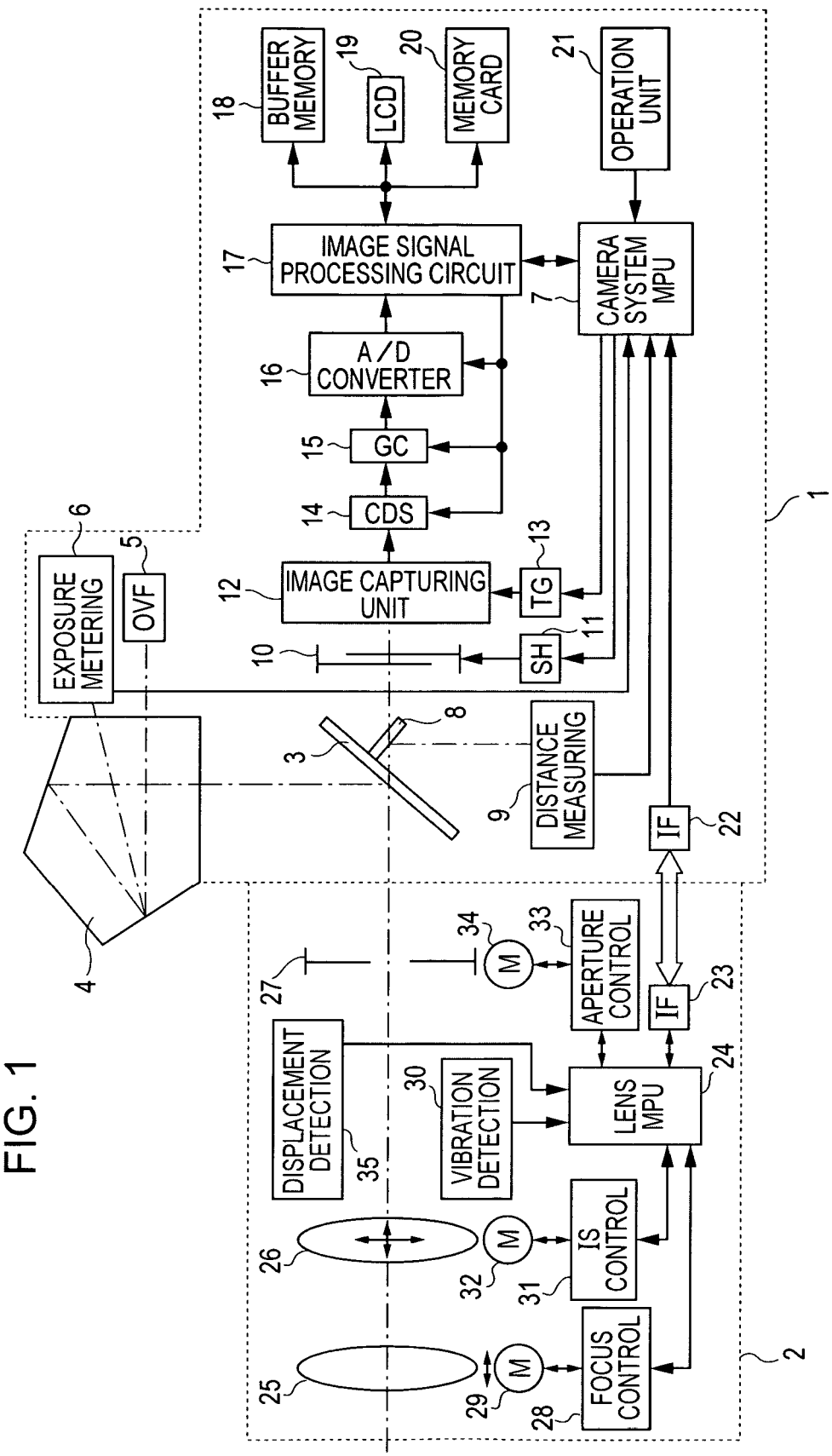
FIG. 1 is a block diagram of a camera system according to an embodiment of the present invention.

FIG. 1 illustrates a camera system including a digital camera body 1 and an interchangeable lens 2. A light beam from a subject passes through an image capturing optical system of the interchangeable lens 2. A part of the light beam is reflected by a quick-return main mirror 3 whose central part is a half mirror at a shooting ready time. Thereafter, the light reflected at this part forms an upright image in a pentaprism 4. Thus, a photographer can view the image of the photographic subject through an optical finder 5. An exposure metering circuit 6 measures the luminance on a focusing plate (not shown). The measurement result is input to a camera system microprocessor unit (MPU) 7 for controlling the camera system. The camera system MPU 7 determines the image capturing conditions, such as an exposure time and aperture. A metering sensor in the exposure metering circuit 6 is divided into a plurality of areas, each of which can measure the light amount.

A sub mirror 8 is disposed on the back surface of the quick-return main mirror 3. The sub mirror 8 allows a light beam passing through the half-mirror surface of the quick-return main mirror 3 to be incident on distance measuring device 9. The distance measuring device 9 photoelectrically converts the incident light beam to carry out signal processing. The resultant signal is output to the camera system MPU 7. During an image capturing operation, the quick-return main mirror 3 and the sub mirror 8 are retracted towards the pentaprism 4. A focal plane shutter 10 is driven by a shutter driving circuit 11 so that the light beam forms an image on an image capturing unit (CCD or CMOS) 12. The captured optical image is photoelectrically converted to an image signal. A timing generator 13 controls an accumulation operation, a readout operation, and a reset operation of the image capturing unit 12.

A correlated double sampling (CDS) circuit 14 reduces accumulation charge noise of the image capturing unit 12. A gain control circuit 15 amplifies the captured image signal. An analog-to-digital (A/D) converter 16 converts the amplified captured image signal from analog to digital. An image signal processing circuit 17 carries out a filtering process, a color conversion process, and a gamma process on the digitized image data. The image signal subjected to the signal processing is stored in a buffer memory 18. The image signal is then displayed on a liquid crystal display (LCD) 19 or is stored in a removable memory card 20. The image signal processing circuit 17 also carries out a process to combine a plurality of images obtained by a plurality of time-sharing exposures so as to generate an exposure-corrected combined image. This combining process is described in detail below.

An operation unit 21 includes switches for setting an image capturing mode of the camera and the file size of an image to be recorded and for executing an image capturing operation. The operation unit 21 is also used for combining a plurality of images obtained by a plurality of time-sharing exposures so as to generate an exposure-corrected combined image. The camera system MPU 7 controls the above-described operations of the digital camera body 1. The camera system MPU 7 also communicates with a lens MPU 24 via an interface circuit 22 of the digital camera body 1 and an interface circuit 23 of the interchangeable lens 2. Additionally, the camera system MPU 7 transmits a focus driving command to the interchangeable lens 2 and exchanges operating conditions of the digital camera body 1 and the interchangeable lens 2 with the lens MPU 24.

The interchangeable lens 2 includes a focus lens 25, an image stabilization lens 26, and an aperture 27, which are parts of the image capturing optical system. The focus lens 25 is driven by a focus control circuit 28 and a focus lens driving motor 29 in response to a control signal from the lens MPU 24. As well as a focus lens driving circuit, the focus control circuit 28 includes a focus encoder for outputting pulse signals in accordance with the movement of the focus lens 25.

The image stabilization lens 26 is driven on the basis of a vibration signal from a vibration detection unit 30 and an image stabilization lens displacement signal output from displacement detection device 35 for detecting the displacement of the image stabilization lens 26. That is, the vibration signal and the image stabilization lens displacement signal are input to the lens MPU 24 and are computed. An image stabilization (IS) control circuit 31 controls an image stabilization operation. The IS control circuit 31 drives a linear motor 32 in response to a command from the lens MPU 24 based on the computation result. Thus, the image stabilization lens 26 moves to improve image blurring. The aperture 27 is driven by an aperture control circuit 33 and a stepping motor 34 in response to a control signal from the lens MPU 24.

The shooting mode for the above-described repeated exposure is described in detail. The exposure period is determined on the basis of the measurement result of the exposure metering circuit 6 and the sensitivity of the image capturing unit 12. If the exposure period is longer than the maximum image-blur-free exposure time determined from the focal length of the interchangeable lens 2, captured image blurring occurs due to hand-shake. Accordingly, the exposure time is divided into a plurality of shorter exposure times (each is shorter than the maximum image-blur-free exposure time) by an exposure period control unit (camera system MPU 7) and an image capturing operation is repeated the number of times equal to the number of divisions. Because of the divided shorter exposure period, each captured image becomes underexposed. However, the captured image is less influenced by hand-shake. After all of the plurality of images are captured, these images are combined into one image so that the exposure is improved.

However, in some cases of continuous image capturing, although each image is not affected by hand-shake, the compositions of the images are slightly shifted relative to each other during the continuous shooting. If these images are directly combined, the combined image has blurring due to the shift of the images. To solve this problem, each image obtained from the plurality of image capturing operations is stored. The image signal processing circuit 17 extracts feature points of the stored images to determine the positions of the feature points in the captured image screen.

Figure 2A:
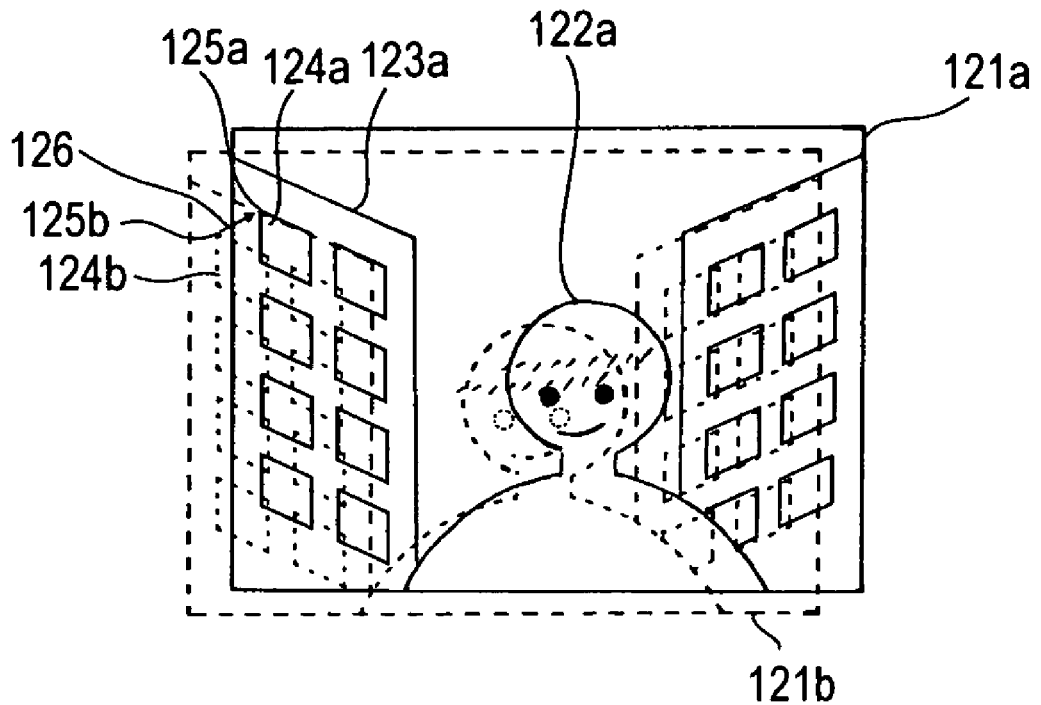
FIGS. 2A and 2B illustrates a coordinate conversion operation according to an embodiment of the present invention.

For example, as shown in FIG. 2A, a picture is taken in which, in a frame 121a, a person 122a is standing with a background of a building 123a. In this case, when a plurality of images are captured, some images may be shifted from that of the frame 121a due to hand-shake, as shown by a frame 121b. To detect the shift, an edge 125a of a window 124a, which has high luminance points in the building 123a positioned at the periphery of the screen, is extracted first as a feature point by an edge detection process. The feature point 125a is compared with a feature point 125b of the frame 121b. The difference is then corrected (coordinate conversion). In FIG. 2A, the frame 121b is coordinate-converted such that, as shown by arrow 126, the feature point 125b of the frame 121b overlaps the feature point 125a of the frame 121a.

Figure 2B:
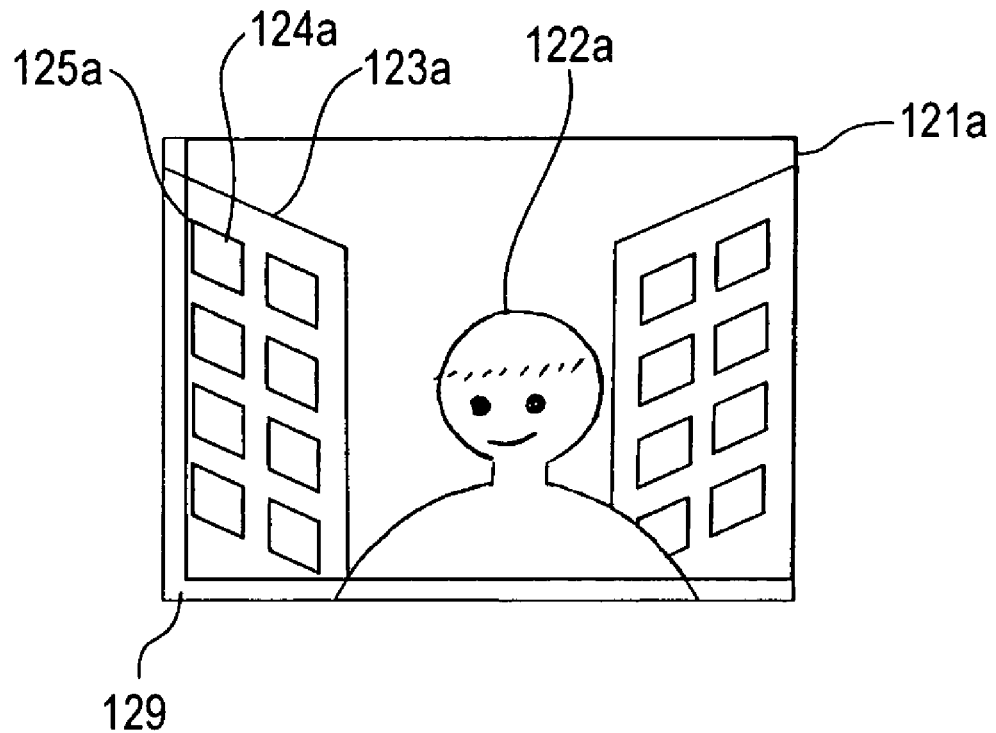

By coordinate-converting each image and overlapping the images to combine them, an image less affected by hand-shake can be obtained. When, as shown in FIG. 2A, two pictures having shifted compositions are combined, an area 129 where the two images do not overlap is produced, as shown in FIG. 2B. Therefore, the area 129 is removed in the combining process. A spreading image completion process is carried out on only an area where the two images overlap to return the combined image to the original size.

In this embodiment, since the interchangeable lens 2 includes image stabilization device, the maximum image-blur-free exposure period increases. The increased maximum image-blur-free exposure period depends on the image stabilization performance of the mounted interchangeable lens 2. For example, one interchangeable lens includes image stabilization device having an image stabilization performance that increases the maximum image-blur-free exposure period by two steps (about a multiple of $2^2$). Another interchangeable lens includes image stabilization device having an image stabilization performance that increases the maximum image-blur-free exposure period by three steps (about a multiple of $2^3$). The maximum image-blur-free exposure period depends on which lens is mounted on the digital camera body 1. Accordingly, to carry out an appropriate shooting operation, it is desirable that the number of time-sharing exposures is changed depending on the mounted interchangeable lens 2. More specifically, since a longer exposure period provides an image having less noise, each time-sharing exposure period is increased to obtain a superior image having low noise as the image stabilization performance of the interchangeable lens 2 increases. Additionally, as the time-sharing exposure period increases, the number of time-sharing exposures decreases. Consequently, the number of shutter operations and the number of charge transfer operations also decreases. As a result, the image capturing time period required to obtain one image can also be decreased.

The image capturing operation of the digital camera body 1 shown in FIG. 1 is described next with reference to a flow chart shown in FIGS. 3 and 4. Here, the digital camera body 1 enters a time-sharing exposure shooting mode by operating the operation unit 21. When a main switch of the digital camera body 1 is turned on, the operation starts from step 100.

(step 100) It is determined whether a release switch in the operation unit 21 of the digital camera body 1 is pressed halfway (SW1 ON). If it is determined that the release switch is pressed halfway, the process proceeds to step 101. Otherwise, the process proceeds to step 130. Thus, the process of step 100 is completed.

(step 101) Camera MPU 7 in the digital camera body 1 communicates camera and lens conditions with the lens MPU 24 via the interface circuits 22 and 23. In this embodiment, Camera MPU 7 in the digital camera body 1 transmits the camera conditions (e.g., a release switch mode "SW1 ON", a shooting mode, and a shutter speed) to the lens, and receives the lens conditions (e.g., a focal length, the number of the image stabilization performance steps, an aperture mode, and a driving condition of the focus lens). The transmissions can be considered to take place via an information transmission unit (lens MPU 24 and interface circuit 23). Although, in the flow chart of this embodiment, only key points of the communication of the camera and lens conditions are described, the communication is carried out when the camera conditions change and the camera body 1 checks the lens conditions. The digital camera body 1 determines the maximum image-blur-free exposure period Tlmt on the basis of the received focal length.

(step 102) Since the release switch is pressed halfway (SW1 ON), the distance measuring device 9 carries out a distance measurement operation and computes a driving amount of the focus lens to focus on a subject.

(step 103) The digital camera body 1 transmits the driving amount of the focus lens to the interchangeable lens 2. This data is transmitted in the form of the number of pulses for driving the focus encoder by a required amount.

(step 104) After driving the focus lens, the digital camera body 1 measures the distance again.

(step 105) The digital camera body 1 determines whether the distance is within the focus depth. If it is determined that the distance is within the focus depth, the process proceeds to step 106. Otherwise, the process returns to step 100.

(step 106) Since the distance is within the focus depth, the digital camera body 1 displays an in-focus indicator. For example, a light-emitting diode (LED) is illuminated in the optical finder 5 of the digital camera body 1, or some sound is output to indicate the in-focus state.

(step 107) The digital camera body 1 acquires the result of exposure metering (i.e., luminance) from the exposure metering circuit 6.

(step 108) The digital camera body 1 computes an exposure period Tv and an aperture value from the metering result and the sensitivity of the image capturing unit.

(step 109) The digital camera body 1 then communicates the camera and lens conditions with the lens MPU 24 via the interface circuits 22 and 23. Here, the digital camera body 1 receives the operating conditions of the IS control circuit 31 and the IS performance value (maximum image-blur-free exposure period shift step value N).

(step 110) The digital camera body 1 determines whether the IS function is active or not on the basis of the result of the communication of the camera and lens conditions at step 109. If the IS function is active, the process proceeds to step 111. Otherwise, the process proceeds to step 112.

(step 111) The digital camera body 1 changes the maximum image-blur-free exposure period Tlmt in accordance with the IS performance value (maximum image-blur-free exposure period shift step value N) obtained from the result of the communication of the camera and lens conditions at step 109. More specifically, the digital camera body 1 computes $Tlmt \times 2^N$. The resultant value is considered to be a new maximum image-blur-free exposure period Tlmt. For example, when N=2, Tlmt×4 is assigned to Tlmt.

(step 112) Thereafter, the digital camera body 1 determines whether the exposure period Tv is longer than the maximum image-blur-free exposure period Tlmt. If the exposure period Tv is longer than the maximum image-blur-free exposure period Tlmt, the process proceeds to step 113. Otherwise, the process proceeds to step 114.

(step 113) Since the exposure period Tv is longer than the maximum image-blur-free exposure period Tlmt, the time-sharing exposures are performed, and therefore, the number of time-sharing exposures is determined. More specifically, the digital camera body 1 computes Tv/Tlmt. The fractional part of that value is rounded up to obtain an integer M. As a result, each time-sharing exposure period is Tv/M and the number of time-sharing exposures is M.

(step 114) It is determined whether a release switch in the operation unit 21 of the digital camera body 1 is pressed all the way down (SW2 ON). If it is determined that the release switch is pressed all the way down, the process proceeds to step 115. Otherwise, the process returns to step 100.

(step 115) The digital camera body 1 locks the quick-return main mirror 3. Simultaneously, the sub mirror 8 is driven towards the pentaprism 4 along with the main mirror 3.

(step 116) The digital camera body 1 transmits the driving amount of the aperture obtained at step 108 to the interchangeable lens 2 to drive the aperture 27.

(step 117) The digital camera body 1 drives a first shutter curtain.

(step 118) The image capturing unit 12 is exposed to the subject image to accumulate electric charge.

(step 119) When the exposure period has elapsed, the digital camera body 1 drives a second shutter curtain to complete the accumulation of charge.

(step 120) The digital camera body 1 transfers (reads out) the charge from the image capturing unit 12.

(step 121) The readout captured image signal is converted to a digital signal via the CDS circuit 14, the gain control circuit 15, and the A/D converter 16. The digital signal is stored in the buffer memory 18.

(step 122) It is determined if the number of exposures has reached the number M set at step 113. If it has reached the number M, the process proceeds to step 123. Otherwise, the process returns to step 117, where another exposure is carried out.

(step 123) The digital camera body 1 transmits a maximum-aperture command to the interchangeable lens 2 so that the value of the aperture 27 returns to the maximum value.

(step 124) The quick-return main mirror 3 and the sub mirror 8 return to the down positions.

(step 125) As described above (see FIGS. 2A-2B), the image signal processing circuit 17 extracts the feature points and calculates the coordinates of the feature points.

(step 126) The coordinates are then converted to improve the coordinates of feature points in each image of the time-sharing exposures.

(step 127) The images in which the coordinates are converted are combined into one image.

(step 128) Image improving processes, such as gamma correction and image compression, are carried out on the image.

(step 129) Image data of the image corrected by the image signal processing circuit 17 is displayed on the LCD 19 and is stored in the removable memory card 20. Thus, a series of image capturing operations is completed.

Figure 5:
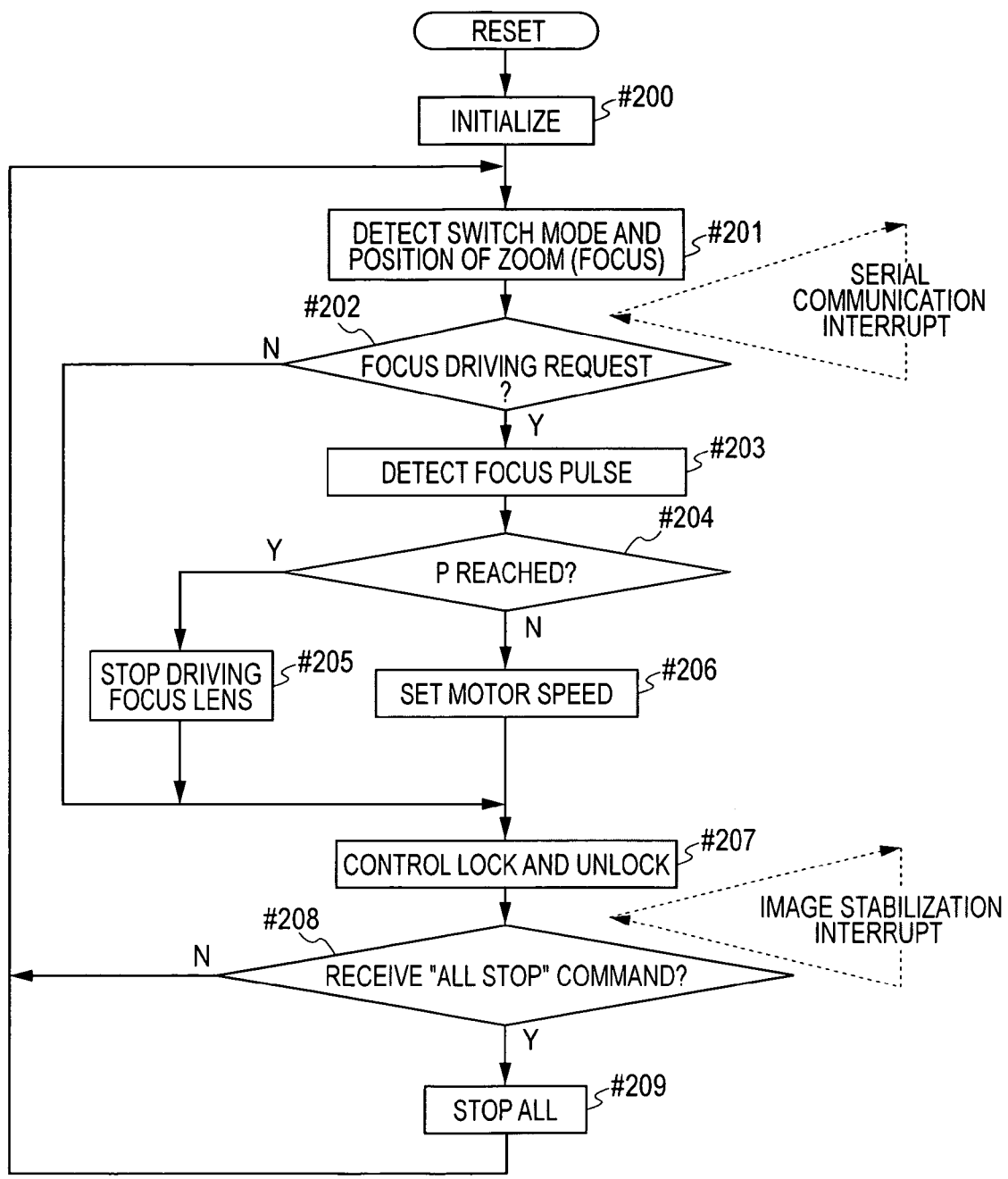
FIG. 5 is a flow chart illustrating the operation of an interchangeable lens according to the first embodiment of the present invention.
Figure 6:
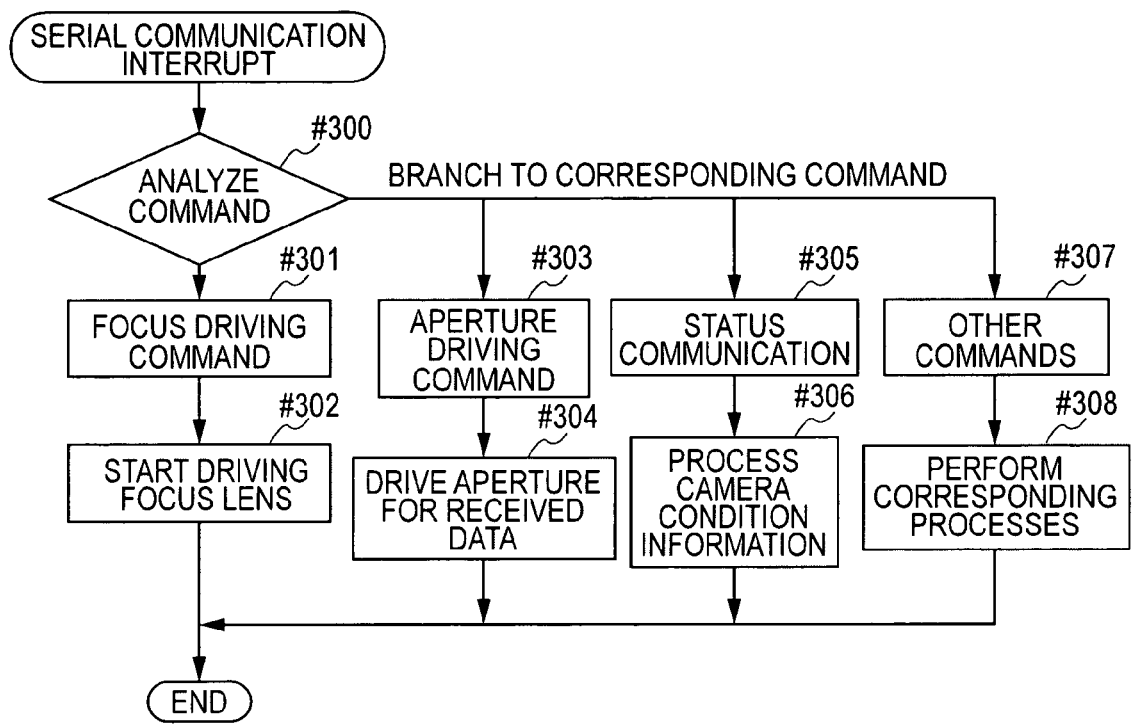
FIG. 6 is a flow chart illustrating the operation of the interchangeable lens according to the first embodiment of the present invention.
Figure 7:
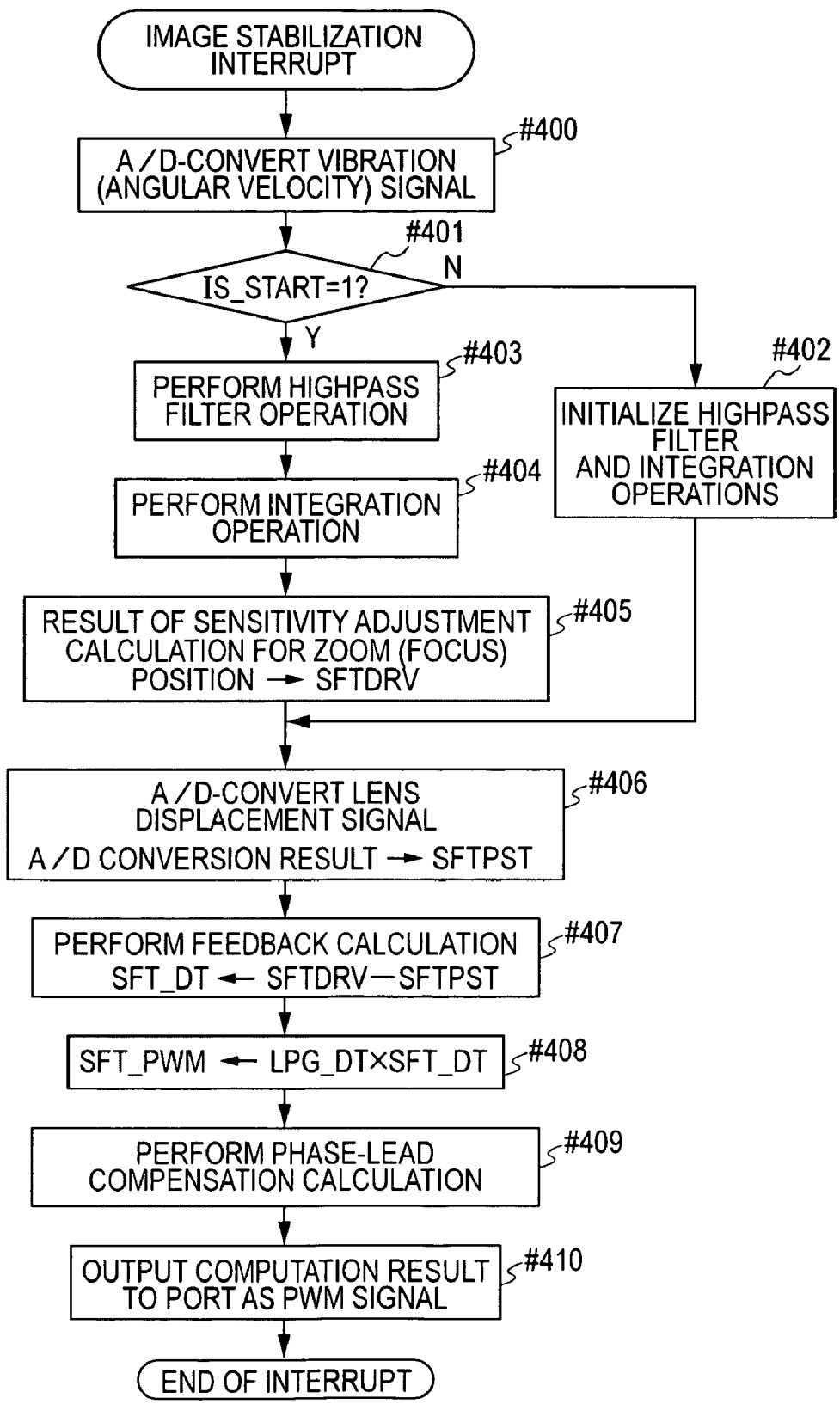
FIG. 7 is a flow chart illustrating an image stabilization operation according to the first embodiment of the present invention.

The operation of the interchangeable lens 2 is described next with reference to a flow chart shown in FIGS. 5, 6, and 7.

When the interchangeable lens 2 is attached to the digital camera body 1, a serial communication is executed from the digital camera body 1 to the interchangeable lens 2. The operation starts from step 200 in FIG. 5.

(step 200) Initialization is carried out for lens control and image stabilization control.

(step 201) The conditions of switches (not shown) and the zoom and focus positions are detected. Examples of the switches include a switch for changing from an auto focus mode to a manual focus mode and vice versa, and an on/off switch for turning on and off the image stabilization function.

(step 202) The interchangeable lens 2 determines whether it has received a focus driving command from the digital camera body 1. If the interchangeable lens 2 has received a focus driving command, the process proceeds to step 203. Otherwise, the process proceeds to step 207.

(step 203) Since the focus driving command contains a driving amount (the number of pulses) of the focus lens 25, the interchangeable lens 2 carries out focus control on the basis of the determined number of pulses while counting the number of pulses output from the focus encoder in the focus control circuit 28.

(step 204) It is determined whether the count has reached the target pulse count P. If the count has reached the target pulse count P, the process proceeds to step 205. Otherwise, the process proceeds to step 206.

(step 205) Since the count has reached the target pulse count P, the drive of the focus lens 25 is stopped.

(step 206) Since the count has not reached the target pulse count P, the speed of the focus lens driving motor 29 is set in accordance with the remaining drive pulse count. As the remaining drive pulse count decreases, the speed of the focus lens driving motor 29 decreases.

(step 207) If the on/off switch for the image stabilization function is turned off at step 201, the image stabilization lens 26 is locked to the optical axis. In contrast, if the on/off switch for the image stabilization function is turned on at step 201 and if the interchangeable lens 2 detects the release switch "SW1 ON" in the digital camera body 1 via the camera and lens condition communication, the interchangeable lens 2 releases the lock (i.e., unlocks) to allow the image stabilization function to be active.

(step 208) The interchangeable lens 2 determines whether it has to received an "all stop" command (i.e., a command to stop all actuators in the interchangeable lens 2) from the digital camera body 1. If the digital camera body 1 is not operated for some time, the digital camera body 1 transmits this command to the interchangeable lens 2. If an all stop command has been received, the process proceeds to step 209. Otherwise, the process returns to step 201.

(step 209) Subsequently, the interchangeable lens 2 stops all operations. Here, the interchangeable lens 2 stops all actuators and causes the lens MPU 24 to enter a sleep (stop) mode. Power supplied to the image stabilization unit is also stopped. When some operation is carried out in the digital camera body 1, the digital camera body 1 transmits a communication signal to the interchangeable lens 2 to return from the sleep mode.

During these operations, if a serial communication interrupt or an image stabilization interrupt is requested, these interrupts are processed. In the serial communication interrupt process, the communication data is decoded, and a lens process, such as the drive of the aperture and the focus lens, is executed in accordance with the decoding result. By analyzing the communication data, "SW1 ON", "SW2 ON", a shutter speed, and the camera model can be determined. The image stabilization interrupt is a timer interrupt that occurs at a predetermined interval to control image stabilization in the pitch direction (vertical direction) and in the yaw direction (horizontal direction).

The serial communication interrupt process is described with reference to a flow chart in FIG. 6. Upon receiving a communication from the digital camera body 1, the process starts from step 300. At step 300, the interchangeable lens 2 analyzes a command from the digital camera body 1 and the process branches to the corresponding sub-process. At step 301, a focus driving command is received. At step 302, the interchangeable lens 2 sets the speed of the focus lens driving motor 29 in accordance with the number of driving pulses and starts driving the focus lens 25. At step 303, an aperture driving command is received. At step 304, the interchangeable lens 2 sets a driving pattern of the stepping motor 34 to drive the aperture 27 in accordance with the transmitted aperture driving data. The set driving pattern is delivered to the stepping motor 34 via the aperture control circuit 33 so as to drive the aperture 27. At step 305, a camera lens status communication command is received. At step 306, the interchangeable lens 2 transmits the focal length of the lens, the IS performance value, and the IS operation mode to the digital camera body 1. The interchangeable lens 2 also receives the mode of the digital camera body 1 (e.g., a release switch state, a shooting mode, and a shutter speed). At step 307, other commands (e.g., a lens focus sensitivity data communication command and a lens optical data communication command) are received. At step 308, the corresponding process is executed.

The image stabilization interrupt is described with reference to a flow chart in FIG. 7. If the image stabilization interrupt occurs during a main operation of the interchangeable lens 2, the lens MPU 24 starts the process of image stabilization from step 400 shown in FIG. 7.

(step 400) the lens MPU 24 performs an analog-to-digital conversion of a vibration signal (angular velocity signal) of the vibration detection unit 30.

(step 401) The lens MPU 24 checks the state of an image stabilization start flag IS_START. The image stabilization start flag IS_START is set in accordance with the mode of the on/off switch for the image stabilization function and the camera mode obtained at step 207 shown in FIG. 5. If IS_START=1, the process proceeds to step 403. If IS_START=0, the process proceeds to step 402.

(step 402) Since the image stabilization is not carried out, the highpass filter and integration operations are initialized. The process then proceeds to step 406.

(step 403) To activate the image stabilization function, the highpass filter operation is carried out. In this operation, the time constant is changed for a predetermined time duration from the start of the image stabilization function in order to reduce image vibration at startup time.

(step 404) The integration operation is carried out. The resultant value is expressed as angular displacement data 0. In this operation, when the camera is panned, the cutoff frequency of integration is changed in accordance with the angular displacement.

(step 405) Since the eccentric distance (sensitivity) of the image stabilization lens 26 with respect to the angle displacement changes as the zoom (focus) position changes, the change is adjusted. More specifically, the zoom (focus) position is divided into several zones. The average optical image stabilization sensitivity (deg/mm) of each zone is retrieved from table data and is converted to correction-lens driving data. The computation result is stored in a random access memory (RAM) area SFTDRV (not shown) in the lens MPU 24.

(step 406) The displacement signal of the image stabilization lens 26 undergoes an analog-to-digital conversion. The resultant signal is stored in a RAM area SFTPST (not shown) in the lens MPU 24.

(step 407) The feedback calculation (SFTDRV-SFTPST) is carried out. The calculation result is stored in a RAM area SFT_DT in the lens MPU 24.

(step 408) A loop gain LPG_DT is multiplied by the calculation result SFT_DT obtained at step 407. The resultant value is stored in a RAM area SFT_PWM in the lens MPU 24.

(step 409) The phase compensation calculation is carried out to obtain a stable control system.

(step 410) The resultant value obtained at step 409 is output to a port of the lens MPU 24 as a pulse-width modulation (PWM) signal. Thus, the image stabilization interrupt is completed. The output signal is input to a driver circuit in the IS control circuit 31. The linear motor 32 drives the image stabilization lens 26 to correct image blurring.

Figure 3:
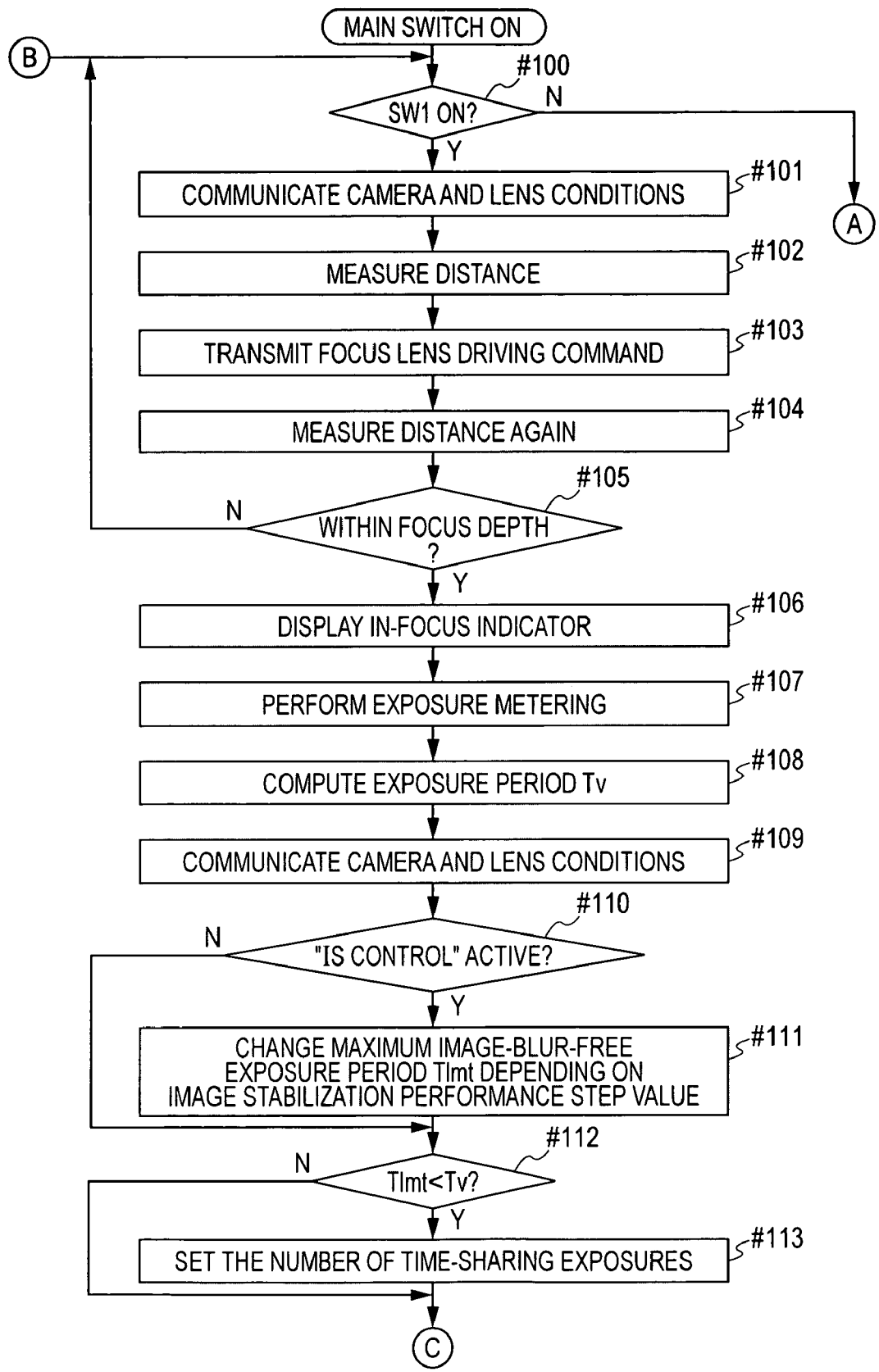
FIG. 3 is a flow chart illustrating the operation of a camera body according to a first embodiment of the present invention.
Figure 4:
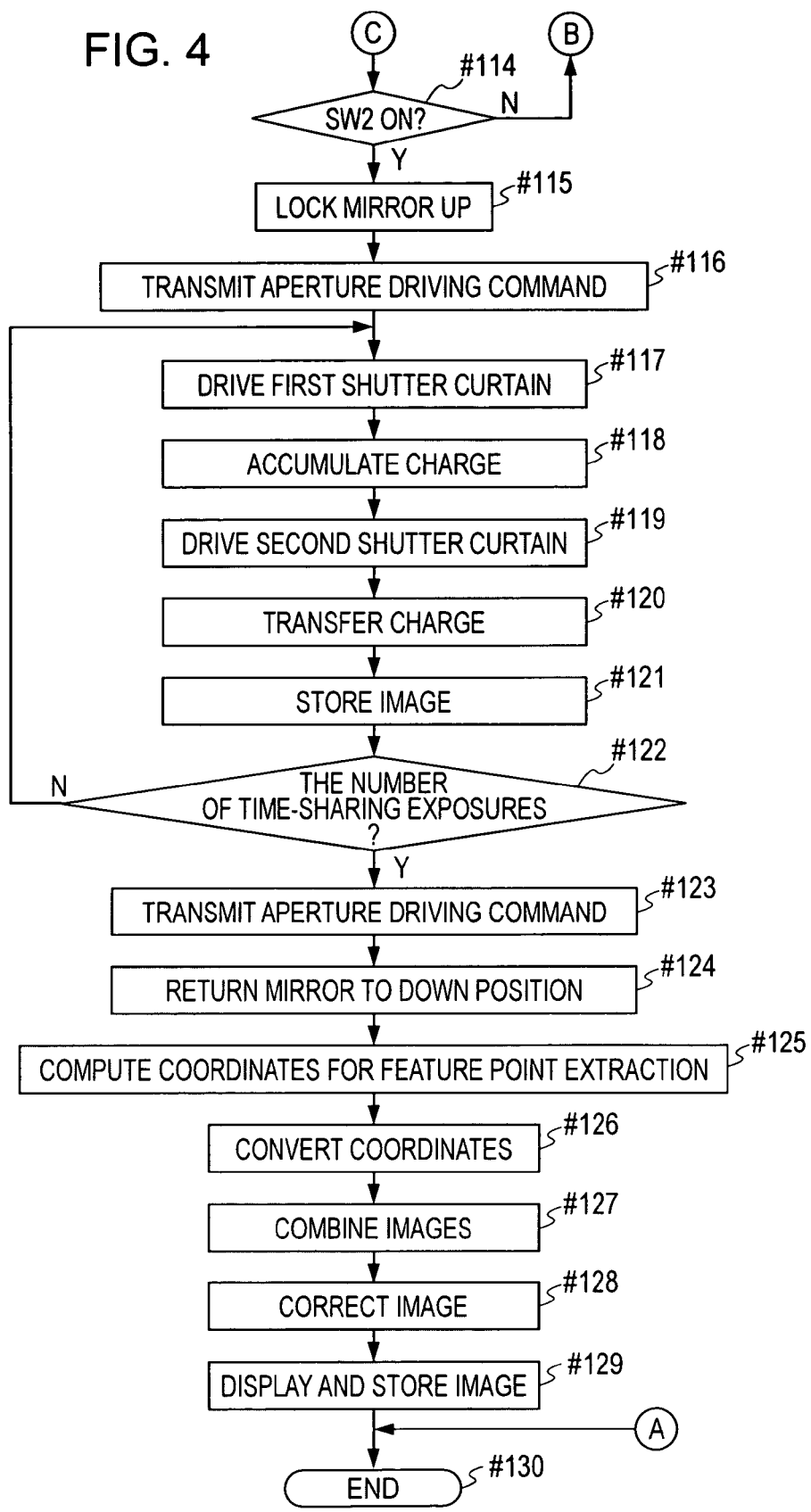
FIG. 4 is a flow chart illustrating the operation of the camera body according to the first embodiment of the present invention.

As described above, the digital camera body 1 carries out the camera and lens condition communication at step 109 shown in FIG. 3. The digital camera body 1 receives the focal length information of the lens, the IS performance value, and the IS operation mode to determine the time-sharing exposure period. Accordingly, the digital camera body 1 can determine the best time-sharing exposure period for the image stabilization performance of the mounted interchangeable lens. That is, as the time-sharing exposure period is determined to be longer, the noise of the image decreases. Therefore, to obtain a superior image having low noise, it is desirable that the time-sharing exposure period increases as the image stabilization performance increases. Additionally, if the time-sharing exposure period increases, the number of time-sharing exposures decreases. Consequently, the number of shutter operations and the number of charge transfer operations also decreases. As a result, the image capturing time period to obtain one combined image can also be decreased.

Figure 8:
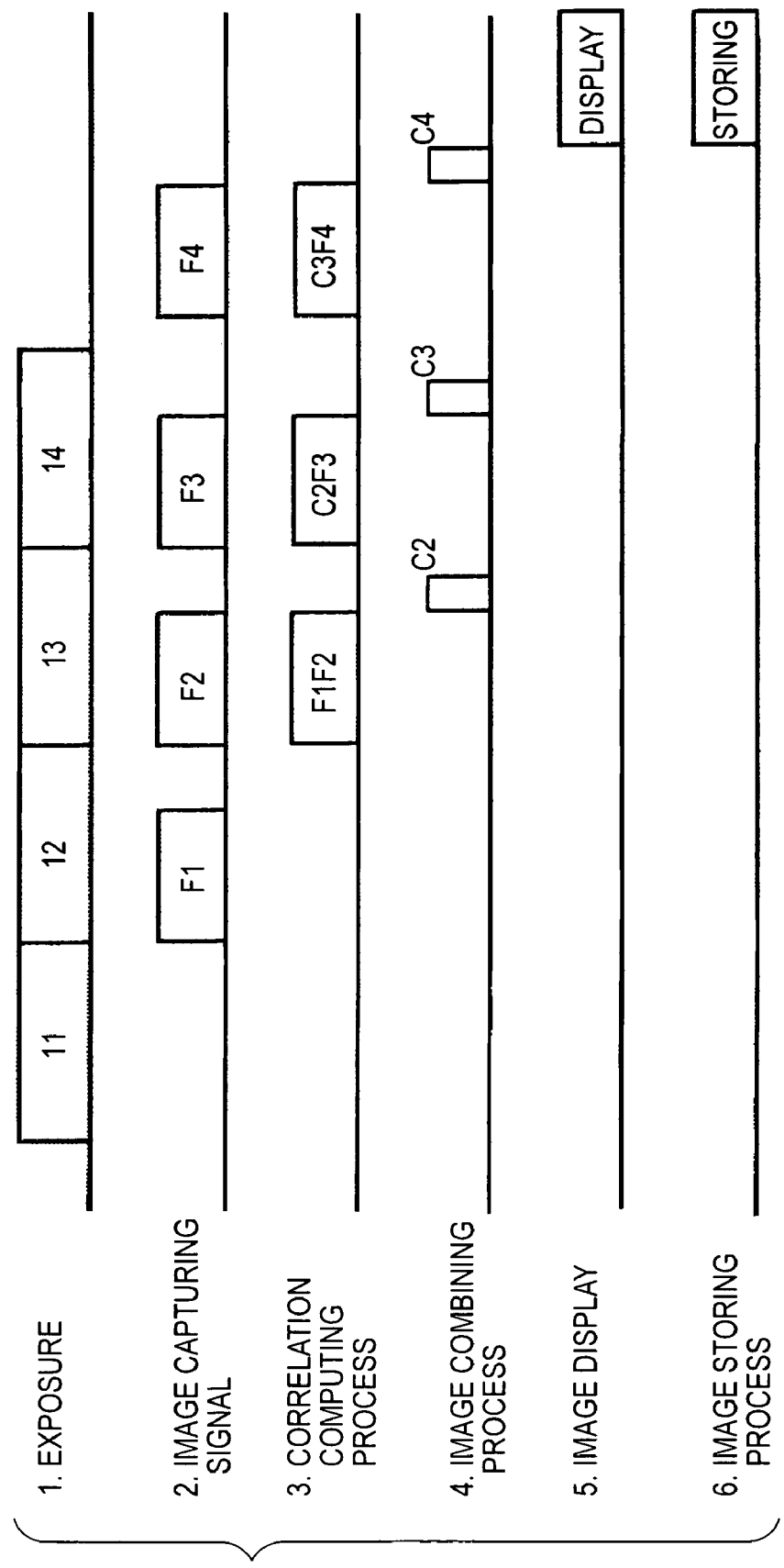
FIG. 8 is a timing diagram of the image capturing operation of the camera body according to a modification of the first embodiment of the present invention.

In this embodiment, images are combined after the coordinate conversion process has been carried out for all of the images and the converted images have been stored. However, the images may be combined while being captured. FIG. 8 is a timing diagram illustrating this operation. When the exposure operation 11 is carried out, a signal that has been photoelectrically converted and charged in the image capturing unit 12 is read out of the image capturing unit 12 as an image capturing signal F1. In the same manner, when the exposure operation 12 is carried out, a signal that has been photoelectrically converted and charged in the image capturing unit 12 is read out of the image capturing unit 12 as an image capturing signal F2. Simultaneously with the readout operation of the image capturing signal F2, the correlation between the previously obtained image capturing signal F1 and the currently obtained image capturing signal F2 is calculated. Thus, the changes in feature points of the two images are computed. The two image capturing signals F1 and F2 are combined to obtain a combined signal C2.

Next, simultaneously with the readout operation of an image capturing signal F3, a change in feature points is calculated by correlation calculation of the previously obtained combined signal C2 and the currently obtained image capturing signal F3. The combined signal C2 is combined with the image capturing signal F3 to obtain a combined signal C3. Thereafter, simultaneously with the readout operation of an image capturing signal F4, a change in feature points is calculated by correlation calculation of the previously obtained combined signal C3 and the currently obtained image capturing signal F4. The combined signal C3 is combined with the image capturing signal F4 to obtain a combined signal C4.

The obtained combined signal C4 (i.e., combined image) is displayed on a liquid crystal display mounted on, for example, the back of the digital camera body 1 and is stored in a recoding medium. As described above, the images may be combined while being captured.

Second Embodiment

A second embodiment of the present invention is described in detail. The structure of the second embodiment is identical to that of the first embodiment shown in FIG. 1, and therefore, the description is not repeated. In the second embodiment, the interchangeable lens 2 computes the maximum image-blur-free exposure period in accordance with the focal length of a lens and the operation mode and operation characteristic of the image stabilization unit. The information is transmitted to the digital camera body 1, which changes the time-sharing exposure period in accordance with the received maximum image-blur-free exposure period.

Figure 9:
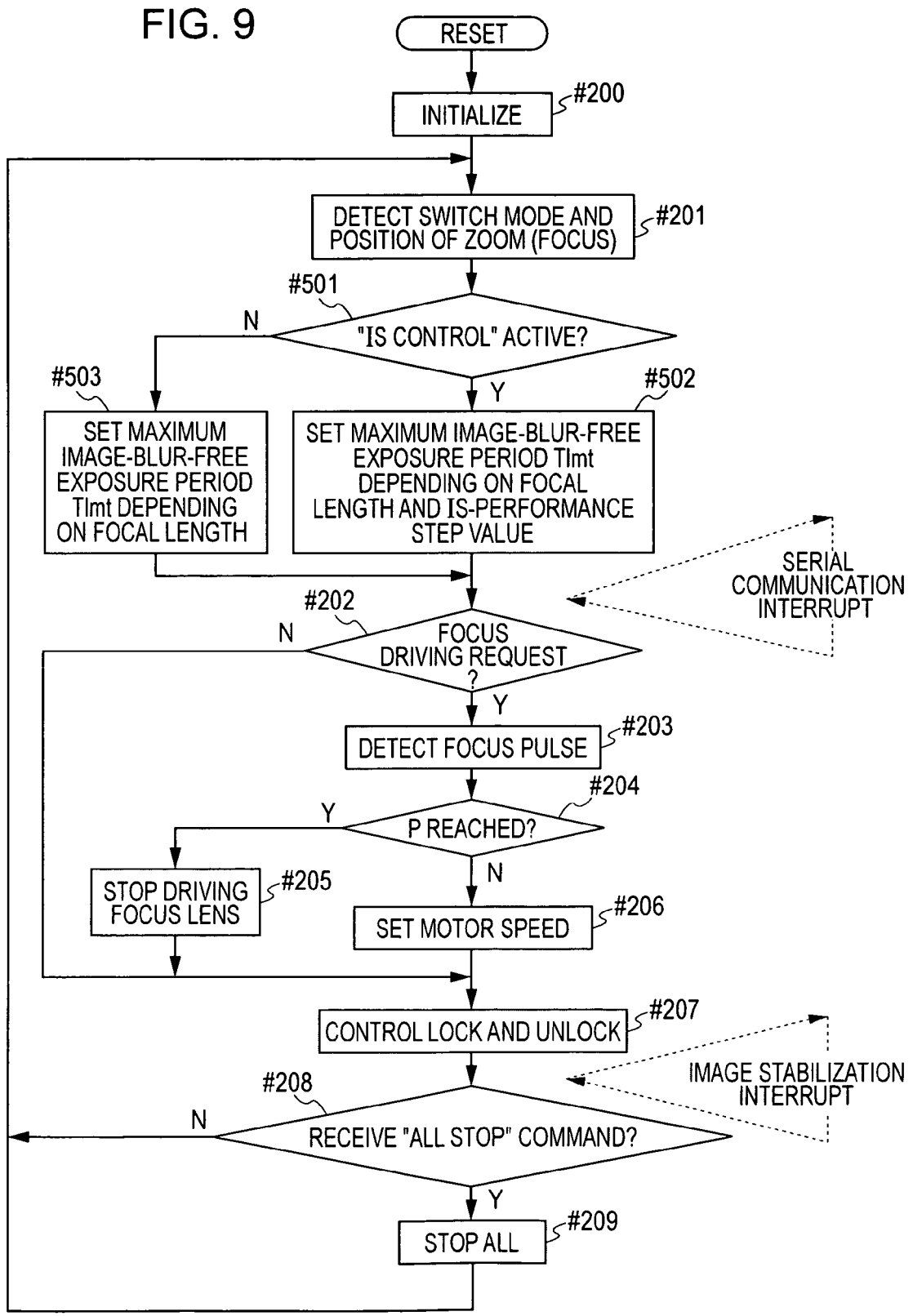
FIG. 9 is a flow chart illustrating the operation of an interchangeable lens according to a second embodiment of the present invention.

The operation of the interchangeable lens 2 is described with reference to a flow chart shown in FIG. 9. The main operations are shown in steps 501 through 503. The other operations are identical to those described in the first embodiment, in which identical step reference numerals designate identical steps. Therefore, the descriptions are not repeated.

(step 501) The interchangeable lens 2 determines whether the IS function is active or not. If the IS function is active, the process proceeds to step 502. Otherwise, the process proceeds to step 503.

(step 502) The interchangeable lens 2 determines the maximum image-blur-free exposure period Tlmt in accordance with a zooming position (focal length information) and the IS performance value (maximum image-blur-free exposure period shift step value N) obtained at step 201.

(step 503) The interchangeable lens 2 determines the maximum image-blur-free exposure period Tlmt in accordance with a zooming position (focal length information) obtained at step 201.

At steps 502 and 503, if the focal length is, for example, 300 mm, the maximum image-blur-free exposure period Tlmt is determined to be $1/300$ (sec) by assuming that the imaging device of the digital camera body 1 has a size of 35 mm full size (36 by 24 mm). At step 502, since the IS function is active, the maximum image-blur-free exposure period Tlmt is shifted to a long exposure period setting in response to the IS performance value. For example, if the IS performance value, namely, the maximum image-blur-free exposure period shift step value is two, the maximum image-blur-free exposure period Tlmt is $1/75$ (sec).

Upon receiving the maximum image-blur-free exposure period Tlmt (at step 504 in FIG. 10), the digital camera body 1 determines whether the exposure period Tv is longer than the maximum image-blur-free exposure period Tlmt at step 112 in FIG. 10, as in the first embodiment. The digital camera body 1 then changes the time-sharing exposure period and the number of time-sharing exposures in accordance with the determined result. As described above, the interchangeable lens 2 calculates the maximum image-blur-free exposure period in accordance with the focal length, IS operation mode, and IS performance value. The calculation result is transmitted to the digital camera body 1, which determines the time-sharing exposure period in accordance with the received maximum image-blur-free exposure period. Accordingly, the digital camera body 1 can determine the best time-sharing exposure period for the image stabilization performance of the mounted interchangeable lens.

In the second embodiment, when the focal length is 300 mm, the maximum image-blur-free exposure period Tlmt is determined to be $1/300$ (sec) by assuming that the imaging device of the digital camera body 1 has a size of 35 mm full size (36 by 24 mm). However, the maximum image-blur-free exposure period Tlmt may be determined to be $1/200$ (sec) or $1/400$ (sec). Additionally, in this embodiment, the maximum image-blur-free exposure period based on the imaging device having a size of 35 mm full size in the digital camera body 1 is transmitted. However, the interchangeable lens 2 may change the maximum image-blur-free exposure period in accordance with the imaging device size of the digital camera body 1 on which the interchangeable lens 2 is mounted. Alternatively, the digital camera body 1 may change the maximum image-blur-free exposure period received from the interchangeable lens 2 in accordance with the imaging device size of the digital camera body 1 on which the interchangeable lens 2 is mounted. Furthermore, in this embodiment, the interchangeable lens 2 calculates the maximum image-blur-free exposure period. However, the digital camera body 1 may calculate the maximum image-blur-free exposure period on the basis of the focal length of the interchangeable lens 2 and the operation mode or operation characteristic of the image stabilization unit. Alternatively, the maximum image-blur-free exposure period may be calculated or modified on the basis of a history of a period between time-sharing exposures after the interchangeable lens 2 is mounted and a history of a shift amount of the captured images.

Additionally, in the above-described embodiments, a camera body includes a quick-return mirror and a shutter. However, the camera may eliminate the quick-return mirror and the shutter and may have a structure in which a subject image is incident on image capturing device at all times. Furthermore, in the above-described embodiments, a light beam from a subject is incident on the distance measuring device via the sub mirror. However, any distance measuring mechanism may be used. Image capturing device may function as the distance measuring device. Still furthermore, in the above-described embodiments, the exposure metering circuit is disposed in the vicinity of the optical finder. However, the exposure metering circuit may be placed at any location. The image capturing device may function as the exposure metering circuit.

According to the above-described embodiments of the present invention, by increasing a time-sharing exposure period in a time-sharing exposure shooting mode of the camera body in accordance with the performance of the image stabilization device provided in the interchangeable lens, an image having low noise and reduced image blurring can be produced. In addition, an image capturing time in the time-sharing exposure shooting mode can be reduced.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims priority from Japanese Application No. 2004-271726 filed Sep. 17, 2004, which is hereby incorporated by reference herein in its entirety.

What is claimed is:

1. A camera system comprising:
   a plurality of interchangeable lenses, each including an image capturing optical system, vibration detection unit, and image stabilization unit;
   an image capturing apparatus arranged to divide an exposure time period into a plurality of shorter exposure periods, the image capturing apparatus including image combining unit for combining a plurality of images captured during each of the shorter exposure periods while correcting an image positional shift among the images; and an exposure period control unit for determining the shorter exposure period in accordance with a mounted interchangeable lens, wherein the shorter exposure period to be longer as the limit of the vibration correction performance of the image stabilization unit in the mounted interchangeable lens is higher.

2. The camera system according to claim 1, wherein the information about one of the operating mode and the operating characteristic of the image stabilization unit includes information about whether the image stabilization unit is active or not.

3. The camera system comprising:

a plurality of interchangeable lenses, each including an image capturing optical system, vibration detection unit, and image stabilization unit;

an image capturing apparatus arranged to divide an exposure time period into a plurality of shorter exposure periods, the image capturing apparatus including image combining unit for combining a plurality of images captured during each of the shorter exposure periods while correcting an image positional shift among the images;

an exposure period control unit for determining the shorter exposure period in accordance with a mounted interchangeable lens;

wherein the exposure period control unit for determining the shorter exposure period in accordance with one of the operating mode and the operating characteristic of the image stabilization unit transmitted from the mounted interchangeable lens; and an information transmission unit for transmitting, to the image capturing apparatus, information about one of an operating mode and an operating characteristic of the image stabilization unit of the mounted interchangeable lens;

wherein the information about one of the operating mode and the operating characteristic of the image stabilization unit includes information about the limit of the image-blur-free performance of the image stabilization unit.

4. An image capturing apparatus for use with a plurality of interchangeable lenses, each lens including an image capturing optical system, vibration detection unit, and image stabilization unit, the apparatus comprising:

a dividing unit for dividing a set exposure time period into a plurality of shorter exposure periods;

a combining unit for combining a plurality of images captured during the shorter exposure periods while correcting an image positional shift among the images; and a determining unit for determining the shorter exposure period in accordance with the mounted interchangeable lens, wherein the shorter exposure period to be longer as the limit of the vibration correction performance of the image stabilization unit in the mounted interchangeable lens is higher.

5. A method of an image capturing apparatus for use with a plurality of interchangeable lenses, each lens including an image capturing optical system, vibration detection unit, and image stabilization unit, the method comprising:

dividing an exposure time period into a plurality of shorter exposure periods;

combining a plurality of images captured during the shorter exposure periods while correcting an image positional shift among the images; and determining the shorter exposure period in accordance with the mounted interchangeable lens, wherein the shorter exposure period to be longer as the limit of the vibration correction performance of the image stabilization unit in the mounted interchangeable lens is higher.

* * * * *